US00RE49876E

(19) United States
(12) Reissued Patent
Harkins

(10) Patent Number: US RE49,876 E
(45) Date of Reissued Patent: Mar. 19, 2024

(54) SECURE CONFIGURATION OF A HEADLESS NETWORKING DEVICE

(71) Applicant: HEWLETT PACKARD ENTERPRISE DEVELOPMENT LP, Houston, TX (US)

(72) Inventor: Daniel N. Harkins, La Selva Beach, CA (US)

(73) Assignee: Hewlett Packard Enterprise Development LP, Spring, TX (US)

(21) Appl. No.: 17/678,980

(22) Filed: Feb. 23, 2022

Related U.S. Patent Documents

Reissue of:
(64) Patent No.: 10,078,524
Issued: Sep. 18, 2018
Appl. No.: 13/783,001
Filed: Mar. 1, 2013

U.S. Applications:
(63) Continuation of application No. 16/443,547, filed on Jun. 17, 2019, now Pat. No. Re. 49,012, which is an application for the reissue of Pat. No. 10,078,524.

(51) Int. Cl.

| | |
|---|---|
| ***G06F 9/4401*** | (2018.01) |
| ***G09C 5/00*** | (2006.01) |
| ***H04L 9/00*** | (2022.01) |
| ***H04L 9/08*** | (2006.01) |
| ***H04L 9/40*** | (2022.01) |
| ***H04W 12/77*** | (2021.01) |

(52) U.S. Cl.
CPC ..... *G06F 9/4411* (2013.01); *G09C 5/00* (2013.01); *H04L 9/006* (2013.01); *H04L 63/0428* (2013.01); *H04L 63/061* (2013.01); *H04L 63/08* (2013.01); *H04L 63/18* (2013.01); *H04L 9/0841* (2013.01); *H04W 12/77* (2021.01)

(58) Field of Classification Search
CPC ..... H04L 63/08; H04L 63/0428; H04L 63/18; H04L 63/062; H04L 63/006; H04L 9/0841; G09C 5/00; G06F 9/4411; H04W 12/77; H03L 9/0841
See application file for complete search history.

(56) References Cited

U.S. PATENT DOCUMENTS 4,956,863 A * 9/1990 Goss ..... H04L 9/0844 380/285
6,980,660 B1 * 12/2005 Hind ..... H04W 12/069 713/168

(Continued)

FOREIGN PATENT DOCUMENTS

WO WO 2013/020172 A1 * 2/2013 ..... H04L 9/30

OTHER PUBLICATIONS

WO 2013/020172: Radio frequency identification technology incorporating cryptographics.*

*Primary Examiner* — Jalatee Worjloh
(74) *Attorney, Agent, or Firm* — Hewlett Packard Enterprise Patent Department

(57) ABSTRACT

The secure configuration of a headless networking device is described. A label associated with the headless networking device is scanned and a public key is determined. scanning a label associated with a networking device. A configuration process is initiated for the networking device using the public key associated with the networking device that was determined based on the scanned label.

51 Claims, 5 Drawing Sheets

(56) References Cited

U.S. PATENT DOCUMENTS

| | | | | |
|---|---|---|---|---|
| 7,711,120 | B2 * | 5/2010 | Kimmel | H04L 63/0428 380/279 |
| 7,716,468 | B2 | 5/2010 | Millet et al. | |
| 7,818,790 | B1 | 10/2010 | Burns et al. | |
| 7,865,727 | B2 | 1/2011 | Zeng et al. | |
| 8,270,603 | B1 * | 9/2012 | Durst et al. | 380/54 |
| 8,447,987 | B1 * | 5/2013 | Polonsky et al. | 713/179 |
| 2003/0046568 | A1 * | 3/2003 | Riddick et al. | 713/193 |
| 2007/0043946 | A1 | 2/2007 | Lauter et al. | |
| 2007/0157024 | A1 * | 7/2007 | Miller | G06F 21/305 713/168 |
| 2012/0128157 | A1 * | 5/2012 | Braun | G06F 21/445 380/270 |
| 2012/0137126 | A1 | 5/2012 | Matsuoka et al. | |
| 2013/0243194 | A1 | 9/2013 | Hawkes et al. | |
| 2014/0286491 | A1 * | 9/2014 | Atherton | G06K 7/10267 380/270 |

* cited by examiner

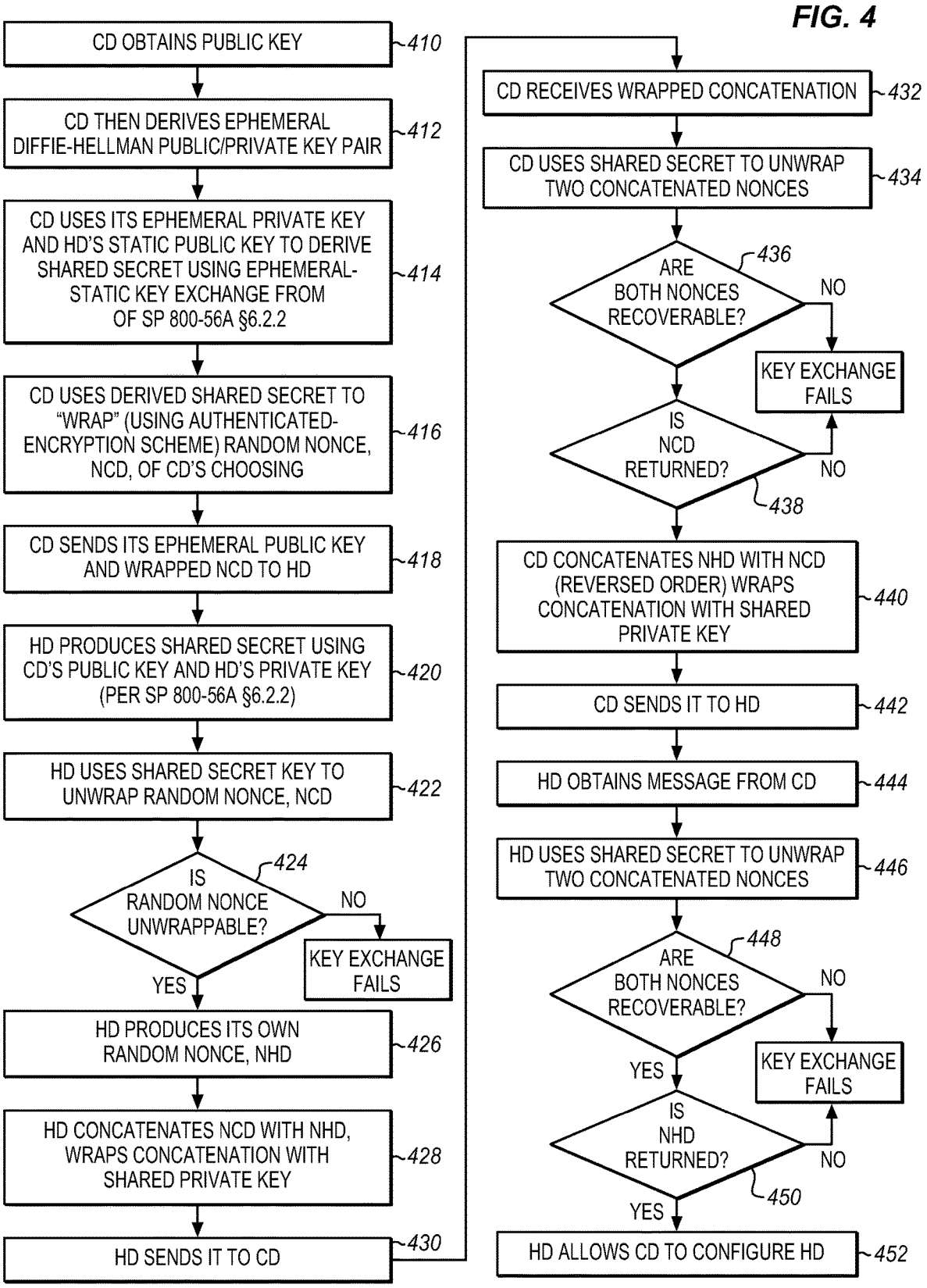
FIG. 4
CD OBTAINS PUBLIC KEY
410
CD THEN DERIVES EPHEMERAL DIFFIE-HELLMAN PUBLIC/PRIVATE KEY PAIR
412
CD USES ITS EPHEMERAL PRIVATE KEY AND HD'S STATIC PUBLIC KEY TO DERIVE SHARED SECRET USING EPHEMERAL-STATIC KEY EXCHANGE FROM OF SP 800-56A §6.2.2
414
CD USES DERIVED SHARED SECRET TO "WRAP" (USING AUTHENTICATED-ENCRYPTION SCHEME) RANDOM NONCE, NCD, OF CD'S CHOOSING
416
CD SENDS ITS EPHEMERAL PUBLIC KEY AND WRAPPED NCD TO HD
418
HD PRODUCES SHARED SECRET USING CD'S PUBLIC KEY AND HD'S PRIVATE KEY (PER SP 800-56A §6.2.2)
420
HD USES SHARED SECRET KEY TO UNWRAP RANDOM NONCE, NCD
422
IS RANDOM NONCE UNWRAPPABLE?
424
NO
KEY EXCHANGE FAILS
YES
HD PRODUCES ITS OWN RANDOM NONCE, NHD
426
HD CONCATENATES NCD WITH NHD, WRAPS CONCATENATION WITH SHARED PRIVATE KEY
428
HD SENDS IT TO CD
430
CD RECEIVES WRAPPED CONCATENATION
432
CD USES SHARED SECRET TO UNWRAP TWO CONCATENATED NONCES
434
ARE BOTH NONCES RECOVERABLE?
436
NO
KEY EXCHANGE FAILS
IS NCD RETURNED?
NO
438
CD CONCATENATES NHD WITH NCD (REVERSED ORDER) WRAPS CONCATENATION WITH SHARED PRIVATE KEY
440
CD SENDS IT TO HD
442
HD OBTAINS MESSAGE FROM CD
444
HD USES SHARED SECRET TO UNWRAP TWO CONCATENATED NONCES
446
ARE BOTH NONCES RECOVERABLE?
448
NO
KEY EXCHANGE FAILS
YES
IS NHD RETURNED?
NO
450
YES
HD ALLOWS CD TO CONFIGURE HD
452

SECURE CONFIGURATION OF A HEADLESS NETWORKING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED REISSUE APPLICATION*

*This application is a continuation reissue of U.S. patent application Ser. No. 16/443,547, filed Jun. 17, 2019, which is an application for reissue of U.S. patent application Ser. No. 13/783,001, filed Mar. 1, 2013, which issued as U.S. Pat. No. 10,078,524 on Sep. 18, 2018.*

FIELD

Embodiments of the disclosure relate to the field of communications, and in particular, to a system, digital device and method that is directed to the configuration of a device on a network.

GENERAL BACKGROUND

In recent years, digital communications have spread to ever more digital devices, ranging from remote environmental sensors, appliances, miniature hand-held digital devices (e.g. cameras, dual-mode cellular telephones, etc.) to networking equipment (e.g. controllers, routers, etc.). For instance, digital devices may be connected to a local area network (LAN) through Ethernet adapters for wired network communications, or wireless adapters such as those operating according to the well-known IEEE 802.11a/ac/b/g/n standards. Such connectivity enables information to be communicated with other digital devices directly or indirectly connected to the LAN. Each of these devices must be configured for a particular network before it can operate on that network.

A headless networking device (HD) is a device that lacks a user interface but has a network interface. It can be an industrial device such as a robot. It can be an enterprise device such as a wireless access point, or it can be a home device such as a "smart grid"-enabled water heater.

A device that lacks a user interface has difficulty in obtaining the appropriate credentials and configuration to access or join a secure network. Such a device is typically configured by assuming that it is initially placed on a trusted network and the configuration protocol, therefore, does not need any security, The first device that contacts the HD is able to configure it. It is assumed that the configuration provided to the HD cannot be observed or intercepted by an unauthorized party and that an unauthorized party cannot access the device to provide a different configuration. However, this assumption may often be false. Headless devices can be placed on a medium which cannot be completely trusted. A wireless medium increases the potential for adversaries to observe, interfere or attack the configuration of the HD.

"Wireless Protected Setup (WPS)" from the Wi-Fi Alliance (WFA) is proposed to increase the security of the configuration of a new device on a Wi-Fi network. The device, such as an HD, to be configured has a PIN (Personal Identification Number) or password burned into the device at manufacture. This PIN or password is also written on a label or on documentation accompanying the HD. This PIN or password is then entered into the user interface of a configuring device (CD). The CD and HD perform a handshake proving possession of the PIN or password and the CD can then configure the HD.

Unfortunately, WPS is susceptible to a dictionary attack that attempts to guess the password. It is also susceptible to snooping to detect the password. An adversary might also take the password directly from the label or documentation. Given the PIN or password the adversary can configure, and take control of, the HD. The adversary may also or instead intercept the configuration that the CD provides after the spoofed authentication. The network configuration information allows the adversary the same access to the secured network that the CD is intended to have. This may be more valuable than configuring the HD.

BRIEF DESCRIPTION OF THE DRAWINGS

The invention may best be understood by referring to the following description and accompanying drawings that are used to illustrate embodiments of the disclosure.

FIG. 4 is an exemplary embodiment of a flow chart for authenticating a digital device for operation on a network.

DETAILED DESCRIPTION

Figure 1:
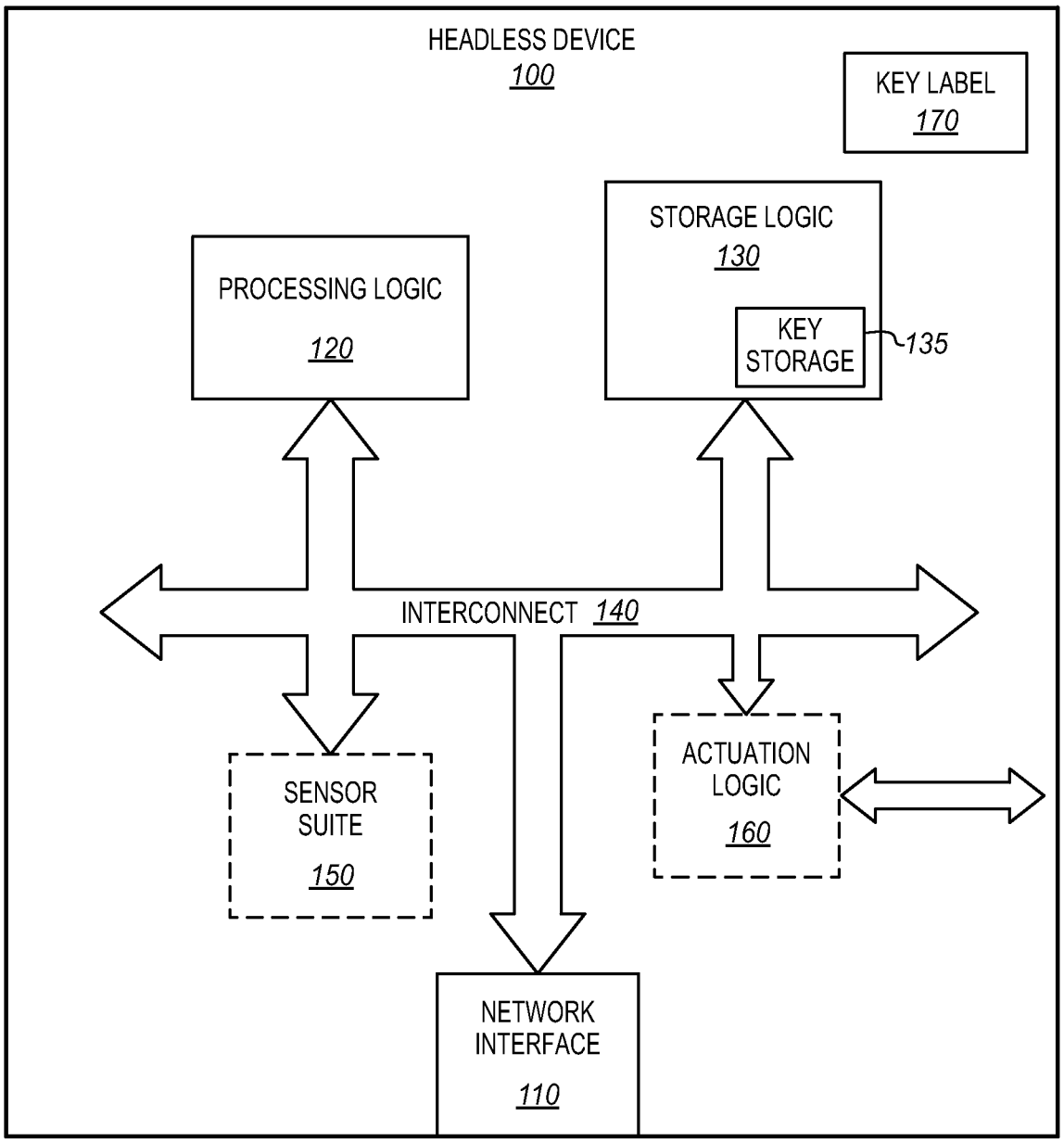
FIG. 1 is an exemplary embodiment of a headless device that may be authenticated on a network.

Embodiments of the disclosure relate to a system, a digital device and method for secure configuration of a headless networking device. The objective of secure configuration is to frustrate the interception of the network configuration by an adversary. Another objective is to limit the network to devices that are intended to have access.

Embodiments are described that provide strong authentication of the HD (Headless Device) to the CD (Configuring Device). The authentication ensures that the devices that the CD configures and allows on the network are authentic. As a result, the HD does not need strong authentication of the CD. The HD can accept configuration by any device that proves it has possession of the HD unique credentials. As described herein the CD ensures that only valid devices are configured, and configurable.

Herein, certain terminology is used to describe features for embodiments of the disclosure. For example, the term "digital device" generally refers to any hardware device that includes processing circuitry running at least one process adapted to manage the flow of control traffic into the device. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral such as Apple® TV, a printer, a mobile handset, a smartphone, a personal digital assistant "PDA", a wireless receiver and/or transmitter, an access point, a base station, a communication management device, a router, a switch, and/or a controller. Examples of digital devices also include a sensor, an appliance, a security device, such as a gate, door or window lock, or a physical plant controller such as for a water heater, steam generator, pumping system, or climate control system.

One type of digital device, referred to as a "controller," is a combination of hardware, software, and/or firmware that is configured to process and/or forward information between digital devices within a network.

It is contemplated that a digital device may include hardware logic such as one or more of the following: (i) processing circuitry; (ii) one or more communication interfaces such as a radio (e.g., component that handles the wireless data transmission/reception) and or a physical connector to support wired connectivity; and/or (iii) a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") and process" are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

The term "interconnect" is a communication path between two or more digital devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "message" is a grouping of data such as a packet, a frame, a stream (e.g., a sequence of packets or frames), an Asynchronous Transfer Mode (ATM) cell, or any other series of bits having a prescribed format. Herein, a message comprises a control payload and a data payload. The control payload is adapted to include control information such as source and destination MAC (Media Access Control) addresses, Internet Protocol (IP) addresses (e.g., IPv4 or IPv6 addressing), protocol, source and destination port information, and/or packet type.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. For instance, illustrative embodiments describe configuring a headless device. Such discussions are for illustrative purposes and do not preclude this invention from being conducted on other types of devices and using different encryption and key exchange systems. Also, well-known logic and operations may not be set forth in detail in order to avoid unnecessarily obscuring this description.

I. General Architecture

Referring to FIG. 1, an exemplary embodiment of a headless device (HD) 100 is shown in block diagram form. In accordance with one embodiment of the disclosure, the headless device 100 comprises a hardware external interface 110, processing logic 120, storage logic 130, and optionally a sensor suite 150 and actuation logic 160. One or more of these logic units are coupled together via an interconnect 140.

The interface 110 enables the headless device 100 to communicate with other devices supporting wired and/or wireless connectivity. For instance, the interface 110 may be implemented as a wireless adapter (e.g., one or more radios, antenna(s) or the like) adapted to receive ingress messages and/or a wired adapter (e.g. connector) through which ingress messages are received over a wired interconnect. In embodiments, the network interface is a Wi-Fi interface, but the invention is not so limited and other wireless and wired interfaces may be used.

Processing logic 120 is adapted with logic to receive and process ingress packets, and provide any packet processing. The processing logic analyzes ingress packets, interprets any commands or other information, performs any calculations and sends commands to any of the other logic. The processing logic also generates egress packets and provides, for example, (1) destination MAC address, (2) source MAC address, (3) IP (DEST IP) address, (4) source IP (SRC IP) address, (5) protocol, (6) destination port number (DEST PORT), and/or (7) source port number (SRC PORT) for any egress packets as appropriate. The processing logic operates using the received network configuration to receive and send packets to designated nodes on the network through the interface 110.

As further shown in FIG. 1, storage logic 130 is volatile and/or non-volatile memory implemented within the headless device 100 and used by the processing logic 120. The storage logic may contain programming instructions and temporary variables for the operation of the processing logic. According to one embodiment of the disclosure, the storage logic contains the network configuration received on setup from a configuring device. According to one embodiment of the disclosure, the storage logic 130 contains keys 135. This may include a public and a private key or a symmetric key. There may be multiple keys for different purposes. There may also be temporary and ephemeral keys. Alternatively, the keys may be stored in the processing logic. The keys may be stored in a special trusted or secure module within the storage logic or provided separately.

As further shown in FIG. 1, the headless device may optionally include a sensor suite 150 and actuation logic 160 both coupled to the interconnect 140 to provide additional functions to the headless device. The particular sensor and actuators may depend on the nature of the device. The sensor suite and actuation logic may be coupled to external devices for information and control either through the interconnection or directly as indicated by the arrows.

For a water heater, the sensors may be temperature sensors and the actuator logic may control a heat source. For a thermostat, the sensors may include temperature sensors in different locations as well as humidity, barometric pressure and air particulates or contaminants. The actuator logic may drive heating, cooling, humidifiers, filters, and other device. For a robot, the sensors and actuator logic may correspond to the entire robot. For a wireless access point, there may be no sensors or actuation logic because the device provides only network interfaces and packet processing.

Finally, the headless device has a label 170 with the device's public key on it. The key may be simply printed as numerical, hexadecimal, or alphanumeric text. Alternatively, or in addition, the key may be printed in machine readable form, such a bar code, a QR code, a holographic code, a magnetic code, or a radio code, such as a passive RFID (Radio Frequency Identification) code. The label may be attached to a housing of the device or it may be in separate documentation provided with the device.

In embodiments, a user reads the key from the label and provides it to a configuring device in order to start the authentication of the headless device. Alternatively, the configuring device or a reader attached directly or remotely to the configuring device may read the label. The label may be human or machine-readable or both. The public key on the label 170 may also be stored in the key storage 135.

In the described example, the headless device has no user interface. There is no display and no user input device, no keyboard, mouse, touch screen, touchpad, or other device. However, the invention is not so limited. The headless device as described herein is not required to have no user interface. Some devices, such as a wireless access point or a wired network switch have no user interface and must be configured remotely. In other devices, such as for example a thermostat or a water heater, there may be a display and some type of user interface such as buttons, or a touch screen for controlling the device, however the device must still be configured remotely. Simpler appliances, such as those on a smart grid, a refrigerator, a television set-top box, or a thermostat, may have a user interface, such as a touchscreen, remote control or other interface that allows for network configuration but may still be configured remotely without using the user interface. Still other devices, such as remote computers, handheld smart devices, such as telephones, media players, and tablets may be configured using the user interface. As described herein, each of these devices may be configured without using the user interface. They are headless for purposes of the remote configuration described herein.

Figure 2:
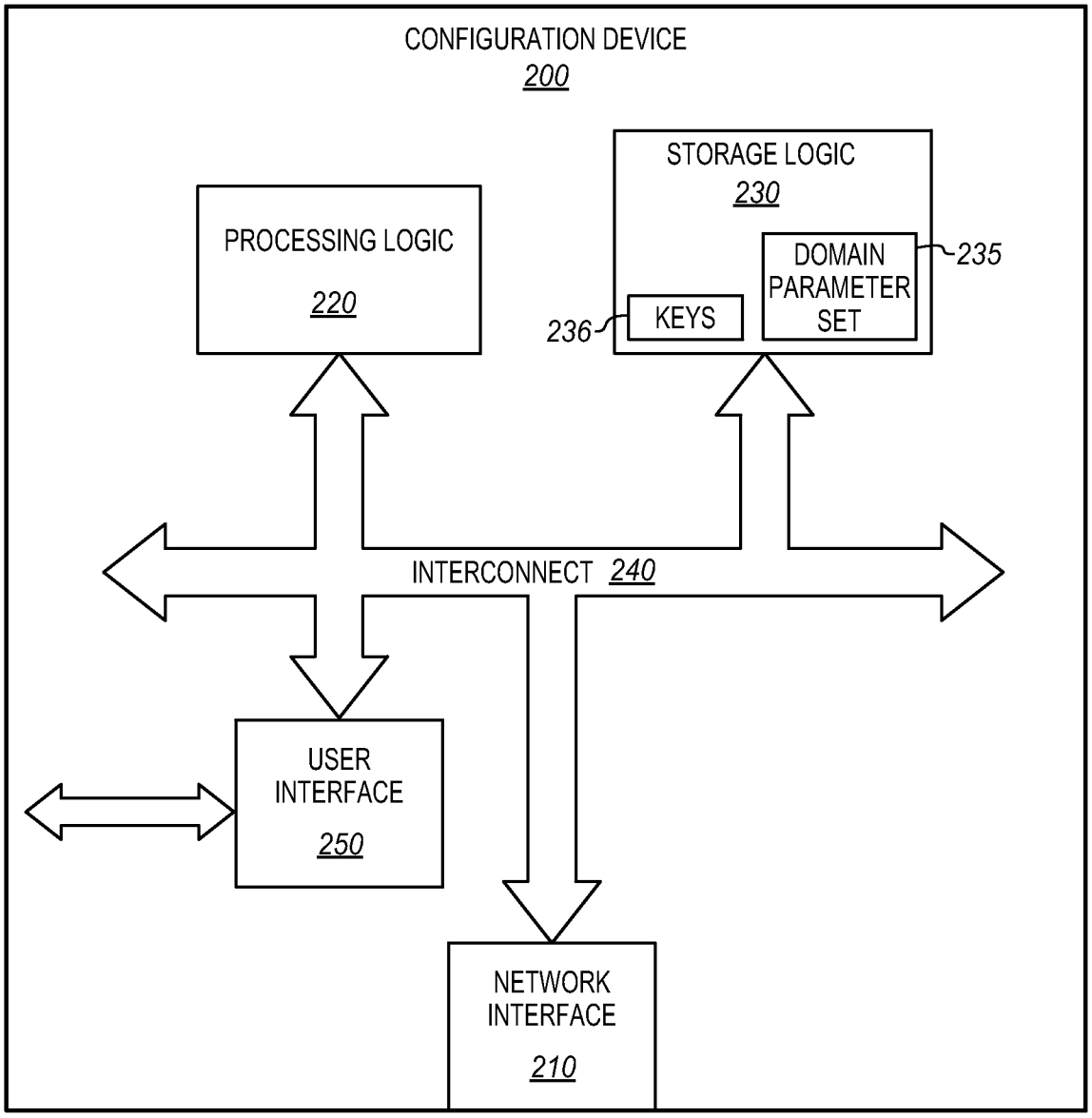
FIG. 2 is an exemplary embodiment of a configuring device that may be authenticated on a network.

Referring to FIG. 2, an exemplary embodiment of a configuring device (CD) 200 is shown in block diagram form. In accordance with one embodiment of the disclosure, the configuring device 200 comprises a hardware external interface 210, processing logic 220, storage logic 230, and a user interface 250. One or more of these logic units are coupled together via an interconnect 240.

The interface 210 enables the configuring device 200 to communicate with other devices supporting wired and/or wireless connectivity. For instance, the interface 210 may be implemented as a wireless adapter (e.g., one or more radios, antenna(s) or the like) adapted to receive ingress messages and/or a wired adapter (e.g. connector) through which ingress messages are received over a wired interconnect. In embodiments, the network interface is a Wi-Fi interface, but the invention is not so limited and other wireless and wired interfaces may be used.

Processing logic 220 is adapted with logic to receive and process ingress packets, and provide any packet processing. If the configuring device is a switch, router, or access point, the processing logic may analyzes ingress packets and perform packet processing and routing operations. The processing logic also performs any calculations and drives any operations appropriate for configuring new devices on the network through the interface 210.

As further shown in FIG. 2, storage logic 230 is volatile and/or non-volatile memory implemented within the configuring device 200 and used by the processing logic 220. The storage logic may contain programming instructions and temporary variables for the operation of the processing logic. According to one embodiment of the disclosure, the storage logic contains the network configuration 235 that is provided to any new network devices, such as the domain parameter set 235. According to one embodiment of the disclosure, the storage logic 230 contains keys 236. This may include a public and a private key or a symmetric key. There may be multiple keys for different purposes. There may also be temporary and ephemeral keys. Alternatively, the keys may be stored in the processing logic. The keys may be stored in a special trusted or secure module within the storage logic or provided separately.

As further shown in FIG. 2, the configuring device also includes a user interface 250. The user interface may include any of a variety of different devices for reading machine readable codes, such as a camera or scanner for optically readable codes, such as bar codes and QR codes. The configuring device may also include RF and magnetic readers. The user interface also includes a display and an input device. This may be a display and a keyboard or a touchscreen or another type of user input device.

Figure 3:
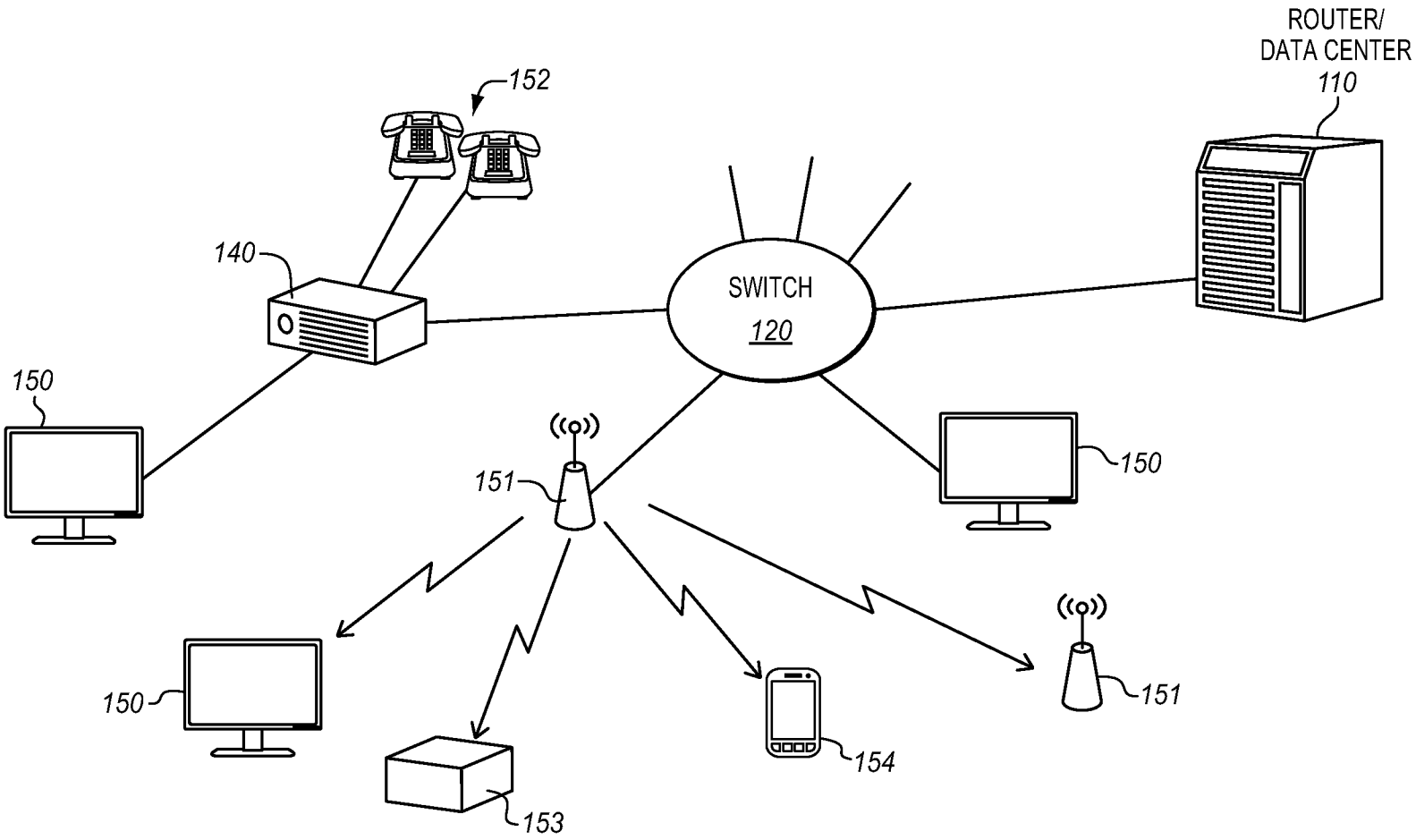
FIG. 3 is an exemplary embodiment of a network architecture including headless and configuring digital devices.

FIG. 3 is a diagram of a general packet processing and routing system architecture with headless devices, switching devices, and one or more configuring devices. A router or data center 110 is coupled to or includes a distribution switch 120 that is coupled to one or more other data centers and domains for packet communication. The distribution switch has uplink and downlink trunks to connect with a variety of different nodes.

Among the nodes, there may be one or more access switches 140 to serve one or more external clients or client ports. Each access switch may include Ethernet ports or a WiFi interface or both. The distribution switch may also be coupled to any of a variety of different client end connections and types, such as trusted or entrusted user data, workstation, and computing terminals 150, wireless access points 151, voice terminals 152, and other devices 153, such as smart displays, appliances, set-top boxes, sensors, and smart grid enabled devices. The end terminals may be connected directly through a single one of the access switches or indirectly through an intermediate switch or access point.

II. Device Configuration

The following description refers to configuring a headless device (HD) using a configuring device (CD). While the described approaches are well-suited to devices that do not have any direct user interface, the HD is only necessarily headless in that no user interface is required for its authentication and configuration. In embodiments, the HD possesses a public/private key pair, based for example on discrete logarithm cryptography. The key pair may be generated at manufacture time for convenience or, if desired, it may be installed later by an administrator or a user.

An identifying label 170 may be attached to or shipped with the HD to allow a user to access the public key. The label may show the public key in plain text or in an encoded or fingerprint form. A bar code, QR code, or other optical or magnetic code may provide the public key on packaging or elsewhere. The public key and its domain parameter set may be affixed to the HD or be part of the documentation or paperwork that accompanies the HD.

FIG. 4 is a process flow diagram for a more detailed example of authenticating a device for configuration. The device that is to be configured is referred to as the HD and the device that will configure the HD is referred to as the CD.

At 410, the CD obtains the public key, for example by scanning the QR code, and implicitly trusts it as being the public key of the HD that the CD wishes to configure. The label could be attached to the physical case of the HD or the HD could use another device to display its label, for example, an HD could be a TV set top box that uses a TV to display its label. Alternatively, if the label contains a fingerprint of the HD's public key then the CD obtains the HD's public key in another manner and verifies the fingerprint before trusting it. In either case, the CD obtains the public key and uses the label to provide the trust necessary for subsequent authentication.

At 412, the CD then generates a secret. In one embodiment, the CD derives an ephemeral public/private key pair, such as a Diffie-Hellman public/private key pair, although other anonymous authentication techniques may be used instead. At 414, the CD uses its ephemeral private key and the HD's static public key to generate a shared secret using an ephemeral-static key exchange. An example of such an exchange is described in "Recommendations for Pair-Wise Key Establishment Schemes Using Discrete Logarithm Cryptography", by E. Barker, D. Johnson, and M. Smid, National Institute for Standards and Technology, NIST Special Publication 800-56A, March 2007, see especially Section 6.2.2 (hereinafter referred to as "SP 800-56A § 6.2.2"). However, the invention is not so limited.

At 416, a message is sent to the HD. In one embodiment, the CD's ephemeral public key is sent to the HD. As an optimization, in addition to the public key, the CD may also formulate a test word for the HD. As an example, the resulting shared secret derived by the CD may be used to wrap a test word for use in testing the HD. In this example, the test word is wrapped using, for example, an authenticated encryption scheme. The test word may be any of a variety of different test words. In one embodiment the CD generates a random nonce, $N_{CD}$, of the CD's choosing. At 418, the CD sends its ephemeral public key and the wrapped $N_{CD}$ to the HD.

At 420, the HD receives the message and derives a shared secret with the CD. In one embodiment, the HD uses discrete logarithm cryptography, for example, SP 800-56A § 6.2.2, with the ephemeral public key received from the CD and its own static private key to derive the secret. The HD's static private key may be stored in a secure register as described above with respect to FIG. 1. If the CD has sent the wrapped nonce, then, using the derived secret, the HD uses the shared secret at 422 to unwrap the random nonce, $N_{CD}$, that it received from the CD.

If the CD sent a wrapped nonce, the HD may then apply a variety of different tests to determine whether the CD knows the HD's public key and whether the exchange should continue. At 424, if the HD cannot unwrap the random nonce, then the HD knows that the CD does not possess the HD's public key and is not a valid device. In this case, the authenticated key exchange fails. The first test for which this test word has been established is failed and the process ends. The HD may apply additional tests, depending on the particular implementation. If the HD is able to unwrap the nonce, or if no nonce was sent, the exchange continues.

If the exchange continues, then at 426, the HD produces its own test word, such as another random nonce, $N_{HD}$. At 428, the HD combines the two nonces into a single word and then wraps them in the shared secret. In a simple example, the HD concatenates the two nonces as $N_{CD}$, $N_{HD}$. While concatenation and wrapping are described herein, any of a variety of different approaches may be used to encrypt integrity protect the two test words with the shared secret, depending on the particular implementation.

The HD then sends the two test words in the encrypted and integrity protected form to the CD at 430. At this stage in the process, the HD still has no assurance that the CD is real or that the message that it received was not a replay of a previous message from a different node or device. For more security, the HD will not yet accept configuration from the sender of the message. If the CD did not send a random nonce, then the HD produces its own test word wraps it in the derived secret and sends it to the CD without any concatenation.

At 432, the CD receives the wrapped concatenation of the two nonces. At 434, the CD uses the shared secret to unwrap the two notices. At 436, the CD determines whether the two nonces are recoverable by verifying the integrity of the message using the authenticated encryption scheme. If both nonces $N_{CD}$, $N_{HD}$, are not recoverable, then at 436 the key exchange fails. The CD knows that there is a security risk. It can assume that the HD does not possess the private analog to the public key that the CD obtained from the label. The HD is therefore an imposter so the authenticated key exchange fails. If the CD has sent only its own nonce, then the same operations are performed with only the one nonce.

At 438, if the one or both nonces are recoverable, depending on how many were received, then the CD checks that its nonce, $N_{CD}$, was returned accurately. If not, then the CD aborts the exchange and the authenticated key exchange fails. If $N_{CD}$ was unwrapped, however, then at 440, the CD builds a new test word combining the nonces in a way that differs from how the HD combined them, and encrypting and integrity protecting them in some way. In one example, the CD concatenates the two nonces in the reverse order $N_{HD}$, $N_{CD}$, wraps the concatenated nonces with the shared secret key and at 442, sends the wrapped concatenation to the HD. In another example, the CD generates a message which proves that it knows $N_{HD}$ the nonce generated by the HD. This could be by adding the value 1 to the nonce or any other technique that results in a different message from the received message but still proves that the CD knows $N_{HD}$.

At this point, the CD has authenticated the HD. It knows that the HD knows the private analog to the public key whose trust was obtained from access to the HD's label. It has proof that the HD is an active participant in the exchange because the HD proved possession of a shared secret that could only have been generated by the HD, and, in some cases, has returned the CD's random nonce. The CD knows that only one device can complete the protocol, the CD can therefore safely proceed to the configuration step with the assurance that the CD has authenticated the headless device that is being configured (the HD).

The HD, however, does not yet have assurance that the CD can be trusted because the CD has not proven knowledge of the shared secret nor that it is an active participant in the exchange. At 444, the HD obtains the message from the CD and at 446, uses the shared secret to unwrap the two nonces. At 448, if they are not recoverable, then the HD knows the CD was unable to unwrap its nonce, that the CD does not possess the HD's public key, and that the CD is not authorized to configure the HD. The authenticated key exchange fails. Alternatively, if the CD did not send its nonce at 416, then the HD similarly attempts to recover the message which proves the CD was able to determine $N_{HD}$.

If the HD is able to unwrap the two nonces, or recover the proof of knowledge of the shared secret, then the process continues. At 450, it checks that its nonce, $N_{HD}$, was returned by the CD, or if the CD demonstrated a proof that it knows $N_{HD}$. If proof of knowledge of $N_{HD}$ was not returned, then the HD aborts the exchange and again the authenticated key exchange fails. If $N_{HD}$ was successfully returned or knowledge was successfully demonstrated, then the HD has an assurance that the CD is an active participant in the exchange, knows the secret, and is in valid possession of the HD's public key. In the example described herein, access to the HD's public key is used to determine whether a user of the CD has physical possession of the HD or some other valid authorization to configure the HD. The exchange has also confirmed that this CD is the active participant in the exchange and not an interloper, snooper, or other imposter. Returning the HD's random nonce shows the CD's possession of the shared secret. Optionally, for additional security, the CD can check to determine whether the CD's nonce, $N_{CD}$, was also successfully returned.

At this stage, if all of the tests are passed, then the CD has authenticated the HD and the HD has an assurance that the device that wants to configure it is in physical possession of its label (or is in possession of the HD's public key by some other means) and is therefore allowed to configure it. At 452, the HD allows the CD to configure it and the CD can now begin a separate protocol to configure the HD.

The CD can configure the HD in any of a variety of different ways. In embodiments, a domain parameter 235 will be sent to the HD together with the addresses for domain name servers. The CD may also configure the HD's IP address, DHCP settings, passwords, and provide any host names for use by the HD, Protocols and packet formats for use on the network may also be defined.

There are other variants involving the protected content that is exchanged, or how the exchange is initiated. In the example described above, a label is used for bootstrapping trust of a public key and a static ephemeral Diffie-Hellman key exchange is used to address an asymmetric security problem involving a headless networking device.

Figure 5:
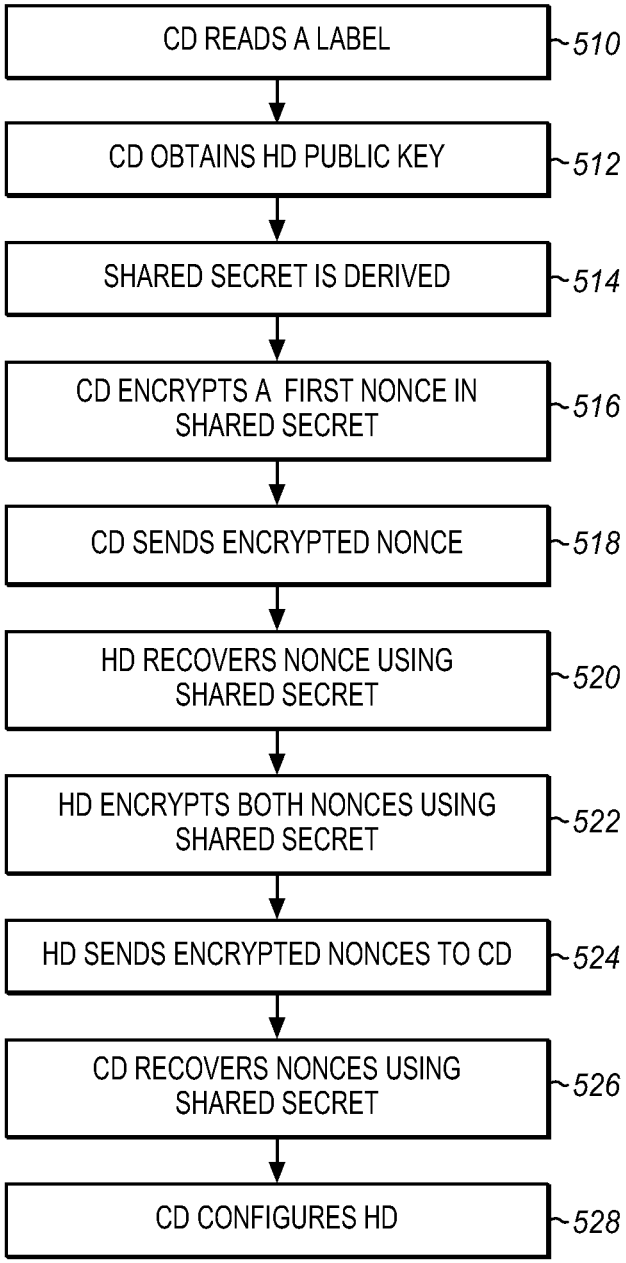
FIG. 5 is an exemplary embodiment of a general flowchart for authenticating a digital device for operation on a network.

The asymmetric security problem relates to a requirement on the CD for strong security. The CD must know that the CD is configuring the right HD and needs proof that the responding HD is the right HD. So in the above example, the CD proves that it is in possession of the public key which the CD has previously trusted through the bootstrapping process. The HD, on the other hand, has low security. It merely needs to know that it is being configured by an entity that controls it, or demonstrates knowledge of its physical characteristics, namely, the label which contains its public key FIG. 5 is a process flow diagram of an alternative message exchange for authenticating the CD and the HD. In the example of FIG. 5, the message exchange is simplified and generalized. The process begins at 510, when the CD scans the HD's label 170. As mentioned above, the label may be attached to or printed on the HD or in documentation or other supporting material of the HD whether machine or human-readable. In one embodiment, a human readable label is read by a human and the code or key is then manually entered into the user interface of the CD. The person reading the label and the person entering the information do not need to be the same or in the same location. At 512, the CD obtains the HD's public key based on the scanning of the label.

At 514, the CD performs an ephemeral key exchange with the HD. This may be a Diffie-Hellman key exchange or any other type key pair exchange. This generates a shared secret between the HD and the CD.

At 516, the CD encrypts a first information, for example a nonce with the shared secret. The information may be any test word that is difficult for imposters to guess. A random or pseudorandom number may be used, but the invention is not so limited.

At 518, the CD sends the encrypted and integrity protected information and, the ephemeral public key, to the HD. The HD uses its static private key and the ephemeral public key of the CD to compute the shared secret. At 520, the HD derives the information, e.g. the nonce, using the shared secret.

To prove itself to the CD, at 522, the HD generates a second information to indicate that it possesses the shared secret from the key exchange. In embodiments, the HD encrypts and integrity protects the received nonce using the same shared secret and at 524, the HD sends the encrypted nonce to the CD. For additional security, as mentioned above, the CD may include its own nonce or any other information or test word.

At 526, the CD receives the second information from the HD and then recovers the received nonce using the shared secret. The CD checks whether the received decrypted nonce matches the one that it originally sent. If there is a match, then the CD has determined that the HD possesses the shared secret and has shown that it is an active participant in the exchange by returning the CD's nonce wrapped in the shared secret. The HD has therefore been authenticated to the CD. At 528, the CD configures the HD.

The CD may also produce a third information (not shown) that is composed of the two nonces transposed in a different manner than the second information. In one embodiment, the order of the nonces is swapped. If the CD did not send a nonce at 516 the CD may compute a third information in a way that proves knowledge of the recovered $N_{HD}$. In one embodiment, the value one is added to $N_{HD}$ to produce the third information. The CD encrypts and integrity protects the third information using the shared secret and sends the encrypted and integrity protected third message to the HD.

If a third information has been produced and sent then the HD receives and unwraps the encrypted and integrity protected third information using the shared secret. If the nonces are unable to be recovered, then the HD knows that the CD was unable to successfully unwrap the second information, does not know $N_{HD}$, does not know the shared secret and therefore is not authorized to configure it. If the third information was successfully unwrapped and $N_{HD}$, or knowledge of $N_{HD}$, was demonstrated, then the exchange completes successfully. The HD has received assurance from the CD that it is in physical possession of the HD or has knowledge of its physical characteristics.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as determined by the appended claims and their equivalents. For instance, different or additional tests may be performed between the two devices, different forms of key generation and exchange may be used, and different test words may be used, depending on the particular implementation. The description is thus to be regarded as illustrative instead of limiting.

What is claimed is:

[1. A non-transitory computer-readable medium comprising instructions which, when executed by one or more hardware processors, cause the one or more hardware processors to:

determine a public key associated with a networking device using an external label associated with the networking device;

authenticate the networking device based upon a determination as to whether the networking device possesses a private key analog to the public key associated with the networking device; and initiate a configuration process for the networking device after the networking device is authenticated, wherein the configuration process facilitates access by the networking device to a secure network, and wherein the configuration process includes sending a domain parameter to provide configuration information for the configuration process and an address for a domain name server to the networking device.]

[2. The non-transitory computer-readable medium of claim 1, wherein to authenticate the networking device, the instructions are further to cause the one or more hardware processors to:

generate a shared secret using the public key associated with the networking device and send the shared secret to the networking device;

encrypt a first information with the shared secret and send the encrypted first information to the networking device; and receive a second information from the networking device that indicates that the networking device possesses the private key analog to the public key associated with the networking device.]

[3. The non-transitory computer-readable medium of claim 2, wherein to authenticate the networking device, the instructions are further to cause the one or more hardware processors to integrity protect the encrypted first information prior to sending the encrypted first information to the networking device.]

[4. The non-transitory computer-readable medium of claim 2, wherein the instructions are further to cause the one or more hardware processors to send assurance to the networking device before initiating the configuration process by encrypting a third information with the shared secret and sending the encrypted third information to the networking device.]

[5. The non-transitory computer-readable medium of claim 2, wherein to authenticate the networking device, the instructions are further to cause the one or more hardware processors to receive an indication from the networking device possessing the shared secret that the networking device possesses the private key analog to the public key associated with the network device. ]

[6. The non-transitory computer-readable medium of claim 2, wherein to generate the shared secret, the instructions are further to cause the one or more hardware processors to perform a static ephemeral Diffie-Hellman key exchange.]

[7. The non-transitory computer-readable medium of claim 2, wherein to encrypt the first information, the instructions are further to cause the one or more hardware processors to wrap a first nonce in the shared secret.]

[8. The non-transitory computer-readable medians of claim 7, wherein to receive the second information, the instructions are further to cause the one or more hardware processors to receive two encrypted nonces and wherein to determine that the networking device possesses the shared secret, the instructions are further to cause the one or more hardware processors to determine whether the encryption of the two nonces is valid.]

[9. The non-transitory computer-readable medium of claim 8, wherein to receive the second information, the instructions are further to cause the one or more hardware processors to receive two nonces encrypted with the shared secret from the networking device, and decrypt and verify the two nonces.]

[10. An apparatus comprising:

one or more hardware processors;

a memory on which is stored instructions that are to cause the one or more hardware processors to:

determine a public key associated with a networking device using an external label associated with the networking device;

authenticate the networking device based upon a determination as to whether the networking device possesses a private key analog to the public key associated with the networking device; and initiate a configuration process for the networking device after the networking device has been authenticated, wherein the configuration process facilitates access by the networking device to a secure network, and wherein the configuration process includes sending a domain parameter to provide configuration information for the configuration process and an address for a domain name server to the networking device.]

[11. The apparatus of claim 10, wherein to authenticate the networking device, the instructions are further to cause the one or more hardware processors to:

generate a shared secret using the public key associated with the networking device and send the shared secret to the networking device;

encrypt a first information with the shared secret and send the encrypted first information to the networking device; and receive a second information from the networking device that indicates that the networking device possesses the private key analog to the public key associated with the net device.]

[12. The apparatus of claim 11, wherein to authenticate the networking device, the instructions are further to cause the one or more hardware processors to integrity protect the encrypted first information prior to sending the encrypted first information to the networking device.]

[13. The apparatus of claim 11, wherein the instructions are further to cause the one or more hardware processors to send assurance to the networking device before initiating the configuration process by encrypting a third information with the shared secret and sending the encrypted third information to the networking device wherein the networking device does not accept configuration unless the networking device can decrypt the third information using the shared secret.]

[14. The apparatus of claim 11, wherein to authenticate the networking device, the instructions are further to cause the one or more hardware processors to receive an indication from the networking device possessing the shared secret that the networking device possesses the private key analog to the public key determined associated with the networking device.]

[15. The apparatus of claim 11, wherein to generate the a shared secret, the instructions are further to cause the one or more hardware processors to perform a static ephemeral Diffie-Hellman key exchange.]

[16. The apparatus of claim 11, wherein to encrypt the first information, the instructions are further to cause the one or more hardware processors to wrap a first nonce in the shared secret.]

[17. The apparatus of claim 16, wherein to receive the second information, the instructions are further to cause the one or more hardware processors to receive two encrypted nonces and wherein to determine that the networking device possesses the shared secret, the instructions are further to cause the one or more hardware processors to determine whether the encryption of the two nonces is valid.]

[18. The apparatus of claim 17, wherein to receive the second information, the instructions are further to cause the one or more hardware processors to receive two nonces encrypted with the shared secret from the networking device, and decrypt and verify the two nonces.]

[19. An apparatus comprising:

an external key label associated with a public key;

an internal secure key storage to store a private key;

a network interface to receive an authentication request from an external device connected to the network, the request including the public key;

internal processing logic to authenticate the apparatus to the external device using the request by proving that it possesses the private key and to configure the apparatus to the network after authenticating, the configuring including receiving a domain parameter and a domain name server from the external device and using the received domain parameter and domain name server to configure the apparatus.]

[20. The apparatus of claim 19, wherein the network interface further receives assurance from the external device, the assurance including an information encrypted with a shared secret, and wherein the processing logic configures the apparatus only if it can decrypt the information using the shared secret.]

*21. A method for authenticating devices, the method comprising:*

*obtaining, by a configuring device, a public key associated with a headless device, wherein the public key is used to initiate an authentication process for the headless device;*

*generating, by the configuring device, a first ephemeral public key and a first ephemeral private key based on the public key associated with the headless device;*

*transmitting, by the configuring device, the first ephemeral public key to the headless device;*

*receiving, by the configuring device, a first encrypted message from the headless device, wherein the first encrypted message is generated by the headless device based in part on the first ephemeral public key;*

*transmitting, by the configuring device, a second encrypted message to the headless device based on the first encrypted message, wherein the second encrypted message is encrypted with a shared secret key; and*

*configuring, by the configuring device, the headless device by transmission of network parameters to the headless device, wherein the network parameters allow the headless device to establish secure access to a network.*

*22. The method of claim 21, further comprising:*

*generating, by the configuring device, a shared secret using a cryptographic technique based on the first ephemeral private key and the public key associated with the headless device wherein the cryptographic technique includes at least discrete logarithm cryptography.*

*23. The method of claim 21, wherein transmitting the first ephemeral public key to the headless device comprises:*

*generating, by the configuring device, a first random nonce with which to encapsulate a first message to form a first encapsulated message; and*

*transmitting, by the configuring device, the first encapsulated message to the headless device, wherein the first encapsulated message includes the first ephemeral public key.*

*24. The method of claim 23, wherein the first encrypted message is generated by the headless device based in part on the first encapsulated message and the first ephemeral public key.*

*25. The method of claim 23, wherein the first encrypted message from the headless device comprises:*

*a second ephemeral public key generated by the headless device; and*

*a concatenation of the first random nonce of the first encapsulated message and a second random nonce generated by the headless device.*

*26. The method of claim 25, further comprising:*

*validating, by the configuring device, the second ephemeral public key from the first encrypted message.*

*27. The method of claim 21, wherein the first encrypted message comprises a first authentication wherein the first authentication is validated and then used to determine that the headless device has been authenticated by the configuring device.*

*28. The method of claim 21, wherein the second encrypted message comprises a second authentication wherein the second authentication allows the headless device to determine authentication of the configuring device.*

*29. A configuring device comprising:*

*a processor; and*

*a memory storing instructions that, when executed by the processor, cause the configuring device to:*

*obtain a public key associated with a headless device, wherein the public key is used to initiate an authentication process for the headless device;*

*generate a first ephemeral public key and a first ephemeral private key based on the public key associated with the headless device;*

*transmit the first ephemeral public key to the headless device;*

*receive a first encrypted message from the headless device, wherein the first encrypted message is generated by the headless device based in part on the first ephemeral public key;*

*transmit a second encrypted message to the headless device based on the first encrypted message, wherein the second encrypted message is encrypted with a shared secret key; and*

*configure the headless device by transmission of network parameters to the headless device, wherein the*

*network parameters allow the headless device to establish secure access to a network.*

*30. The configuring device of claim 29, wherein the instructions, when executed, further cause the configuring device to:*

*generate a shared secret using a cryptographic technique based on the first ephemeral private key and the public key associated with the headless device wherein the cryptographic technique includes at least discrete logarithm cryptography.*

*31. The configuring device of claim 29, wherein transmitting the first ephemeral public key to the headless device comprises:*

*generating a first random nonce with which to encapsulate a first message to form a first encapsulated message; and*

*transmitting the first encapsulated message to the headless device, wherein the first encapsulated message includes the first ephemeral public key.*

*32. The configuring device of claim 31, wherein the first encrypted message is generated by the headless device based in part on the first encapsulated message and the first ephemeral public key.*

*33. The configuring device of claim 31, wherein the first encrypted message from the headless device comprises:*

*a second ephemeral public key generated by the headless device; and*

*a concatenation of the first random nonce of the first encapsulated message and a second random nonce generated by the headless device.*

*34. The configuring device of claim 33, wherein the instructions, when executed, further cause the configuring device to:*

*validate the second ephemeral public key from the first encrypted message.*

*35. The configuring device of claim 29, wherein the first encrypted message comprises a first authentication wherein the first authentication is validated and then used to determine that the headless device has been authenticated by the configuring device.*

*36. The configuring device of claim 29, wherein the second encrypted message comprises a second authentication wherein the second authentication allows the headless device to determine authentication of the configuring device.*

*37. A non-transitory storage medium of a configuring device storing instructions that, when executed by a processor of the configuring device, configure the configuring device to:*

*obtain a public key associated with a headless device, wherein the public key is used to initiate an authentication process for the headless device;*

*generate a first ephemeral public key and a first ephemeral private key based on the public key associated with the headless device;*

*transmit the first ephemeral public key to the headless device;*

*receive a first encrypted message from the headless device, wherein the first encrypted message is generated by the headless device based in part on the first ephemeral public key;*

*transmit a second encrypted message to the headless device based on the first encrypted message, wherein the second encrypted message is encrypted with a shared secret key; and*

*configure the headless device by transmission of network parameters to the headless device, wherein the network parameters allow the headless device to establish secure access to a network.*

*38. The non-transitory storage medium of claim 37, wherein the instructions, when executed, further cause the configuring device to:*

*generate a shared secret using a cryptographic technique based on the first ephemeral private key and the public key associated with the headless device wherein the cryptographic technique includes at least discrete logarithm cryptography.*

*39. The non-transitory storage medium of claim 37, wherein transmitting the first ephemeral public key to the headless device comprises:*

*generating a first random nonce with which to encapsulate a first message to form a first encapsulated message; and*

*transmitting the first encapsulated message to the headless device, wherein the first encapsulated message includes the first ephemeral public key.*

*40. The non-transitory storage medium of claim 39, wherein the first encrypted message is generated by the headless device based in part on the first encapsulated message and the first ephemeral public key.*

*41. The non-transitory storage medium of claim 39, wherein the first encrypted message from the headless device comprises:*

*a second ephemeral public key generated by the headless device; and*

*a concatenation of the first random nonce of the first encapsulated message and a second random nonce generated by the headless device.*

*42. The non-transitory storage medium of claim 41, wherein the instructions, when executed, further cause the configuring device to:*

*validate the second ephemeral public key from the first encrypted message.*

*43. The non-transitory storage medium of claim 37, wherein the first encrypted message comprises a first authentication wherein the first authentication is validated and then used to determine that the headless device has been authenticated by the configuring device.*

*44. The non-transitory storage medium of claim 37, wherein the second encrypted message comprises a second authentication wherein the second authentication allows the headless device to determine authentication of the configuring device.*

*45. A method for authenticating devices, the method comprising:*

*providing, by a headless device, a public key associated with the headless device to a configuring device, wherein an authentication process is initiated after providing the public key;*

*receiving, by the headless device, a first ephemeral public key from the configuring device, wherein the first ephemeral public key is generated by the configuring device based on the public key associated with the headless device;*

*generating, by the headless device, a first encrypted message, wherein the first encrypted message is based in part on the first ephemeral public key;*

*transmitting, by the headless device, the first encrypted message to the configuring device; and*

*receiving, by the headless device, a second encrypted message from the configuring device, wherein the second encrypted message is encrypted with a shared secret key.*

*46. The method of claim 45, further comprising:*

*generating, by the headless device, a shared secret based on the first ephemeral public key and a private key associated with the headless device.*

*47. The method of claim 45, wherein the first encrypted message comprises a first authentication, wherein the first authentication allows the configuring device to determine authentication of the headless device.*

*48. The method of claim 45, the method further comprising:*

*receiving, by the headless device, a first encapsulated message from the configuring device, wherein the first encapsulated message comprises a first random nonce, wherein the first random nonce is generated by the configuring device.*

*49. The method of claim 48, wherein the first encrypted message is generated based in part on the first ephemeral public key and the first encapsulated message.*

*50. The method of claim 48, wherein generating the first encrypted message further comprises:*

*generating, by the headless device, a second random nonce;*

*generating, by the headless device, a second ephemeral public key based on the first ephemeral public key; and*

*concatenating, by the headless device, the first random nonce of the first encapsulated message and the second random nonce generated by the headless device.*

*51. The method of claim 45, further comprising:*

*receiving, by the headless device, configuration information from the configuring device, wherein the configuration information comprises network parameters.*

*52. The method of claim 51, wherein the network parameters are used by the headless device to establish secure access to a network.*

*53. The method of claim 45, wherein the second encrypted message comprises a second authentication wherein the second authentication is validated and then used to determine that the configuring device has been authenticated by the headless device.*

*54. A headless device comprising:*

*a processor; and*

*a memory storing instructions that, when executed by the processor, cause the headless device to:*

*provide a public key associated with the headless device to a configuring device, wherein an authentication process is initiated after providing the public key;*

*receive a first ephemeral public key from the configuring device, wherein the first ephemeral public key is generated by the configuring device based on the public key associated with the headless device;*

*generate a first encrypted message, wherein the first encrypted message is based in part on the first ephemeral public key;*

*transmit the first encrypted message to the configuring device; and*

*receive a second encrypted message from the configuring device, wherein the second encrypted message is encrypted with a shared secret key.*

*55. The headless device of claim 54, wherein the instructions, when executed, further cause the headless device to:*

*generate a shared secret based on the first ephemeral public key and a private key associated with the headless device.*

*56. The headless device of claim 54, wherein the first encrypted message comprises a first authentication, wherein the first authentication allows the configuring device to determine authentication of the headless device.*

*57. The headless device of claim 54, wherein the instructions, when executed, further cause the headless device to:*

*receive a first encapsulated message from the configuring device, wherein the first encapsulated message comprises a first random nonce, wherein the first random nonce is generated by the configuring device.*

*58. The headless device of claim 57, wherein the first encrypted message is generated based in part on the first ephemeral public key and the first encapsulated message.*

*59. The headless device of claim 57, wherein generating the first encrypted message further comprises:*

*generating a second random nonce;*

*generating a second ephemeral public key based on the first ephemeral public key; and*

*concatenating the first random nonce of the first encapsulated message and the second random nonce generated by the headless device.*

*60. The headless device of claim 54, wherein the instructions, when executed, further cause the headless device to:*

*receive configuration information from the configuring device, wherein the configuration information comprises network parameters.*

*61. The headless device of claim 60, wherein the network parameters are used by the headless device to establish secure access to a network.*

*62. The headless device of claim 54, wherein the second encrypted message comprises a second authentication wherein the second authentication is validated and then used to determine that the configuring device has been authenticated by the headless device.*

*63. A non-transitory medium of a headless device storing instructions that, when executed by a processor of the headless device, cause the headless device to:*

*provide a public key associated with the headless device to a configuring device, wherein an authentication process is initiated after providing the public key;*

*receive a first ephemeral public key from the configuring device, wherein the first ephemeral public key is generated by the configuring device based on the public key associated with the headless device;*

*generate a first encrypted message, wherein the first encrypted message is based in part on the first ephemeral public key;*

*transmit the first encrypted message to the configuring device; and*

*receive a second encrypted message from the configuring device, wherein the second encrypted message is encrypted with a shared secret key.*

*64. The non-transitory medium of claim 63, wherein the instructions, when executed, further cause the headless device to:*

*generate a shared secret based on the first ephemeral public key and a private key associated with the headless device.*

*65. The non-transitory medium of claim 63, wherein the first encrypted message comprises a first authentication, wherein the first authentication allows the configuring device to determine authentication of the headless device.*

*66. The non-transitory medium of claim 63, wherein the instructions, when executed, further cause the headless device to:*

*receive a first encapsulated message from the configuring device, wherein the first encapsulated message comprises a first random nonce, wherein the first random nonce is generated by the configuring device.*

*67. The non-transitory medium of claim 66, wherein the first encrypted message is generated based in part on the first ephemeral public key and the first encapsulated message.*

*68. The non-transitory medium of claim 66, wherein generating the first encrypted message further comprises:*

*generating a second random nonce;*

*generating a second ephemeral public key based on the first ephemeral public key; and*

*concatenating the first random nonce of the first encapsulated message and the second random nonce generated by the headless device.*

*69. The non-transitory medium of claim 63, wherein the instructions, when executed, further cause the headless device to:*

*receive configuration information from the configuring device, wherein the configuration information comprises network parameters.*

*70. The non-transitory medium of claim 69, wherein the network parameters are used by the headless device to establish secure access to a network.*

*71. The non-transitory medium of claim 63, wherein the second encrypted message comprises a second authentication wherein the second authentication is validated and then used to determine that the configuring device has been authenticated by the headless device.*

* * * * *